United States Patent Office 3,380,949
Patented Apr. 30, 1968

3,380,949
MANUFACTURE OF SHAPED SYNTHETIC
POLYMER ARTICLES
Ralph E. Isley, Northfield, and Kenneth E. Blower, Warrensville Heights, Ohio, assignors to The Standard Oil Company, Cleveland, Ohio, a corporation of Ohio
No Drawing. Filed June 23, 1965, Ser. No. 466,423
12 Claims. (Cl. 260—30.4)

The present invention relates to a process for the manufacture of shaped articles by the elevated temperature forming of a dry blend of a particulate high polymer and solvent and more particularly pertains to the manufacture of shaped polyacrylonitrile articles by the elevated temperature forming of a dry blend of a particulate acrylonitrile polymer having a certain minimum surface area and a solvent for said acrylonitrile polymer.

It is known that acrylonitrile polymers including homopolymers and copolymers containing about 90% by weight or more of polymerized acrylonitrile are not thermoplastic in nature and cannot be formed at elevated temperatures by milling, extrusion, compression molding, drawing, or by other commonly employed operations normally used in the forming of shaped articles from truly thermoplastic materials. The use of non-solvents has been suggested for a special type of dry forming of acrylonitrile polymers in U.S. Patents Nos. 2,585,444 and 2,585,499.

Acrylonitrile polymers do have many excellent physical and chemical properties which are highly desirable in shaped articles; however, these polymers must be formed by some means other than the conventional ones and this is decidedly disadvantageous and could very well be the reason why acrylonitrile polymer shaped articles, other than fibers which are ordinarily spun from solutions containing a major proportion of solvent, are not widely available for use in commerce.

We have discovered that shaped articles such as pipes, sheets, films, dishes, cups, bottles, mono-filaments, and the like can readily be prepared from acrylonitrile polymers composed of 90% or more of polymerized acrylonitrile by a process comprising dry blending a particulate acrylonitrile polymer having a certain minimum surface area or bulk density with a solvent component, plastifying this blend at an elevated temperature, forming the plastified blend of acrylonitrile polymer and solvent component into a shaped article and removing substantially all of the solvent from said shaped article.

The present process has at least two main advantages over known solvent casting processes in the shaping of acrylonitrile film articles in that there is much less residual solvent to remove and much thicker gauge film articles can be formed than in the former process. Unlike solvent casting processes, our process is not limited to acrylonitrile polymers of a certain maximum molecular weight range.

The most preferred acrylonitrile polymer in the present process is acrylonitrile homopolymer. It is also contemplated to be within the scope of this invention to replace up to about 10% and preferably about 5% of the acrylonitrile in the polymer with one or more polymerizable monoalkenyl or polyalkenyl monomers copolymerizable with acrylonitrile.

Useful monoalkenyl monomers include the acrylate esters such as methyl acrylate, ethyl acrylate, the propyl acrylates, the butyl acrylates, the amyl acrylates, the hexyl acrylates, cyclohexyl acrylate, phenyl acrylate, the octyl acrylates and the like; the methacrylate esters such as methyl methacrylate, ethyl methacrylate, the propyl methacrylates, the butyl methacrylates, the amyl methacrylates, the hexyl methacrylates, cyclohexyl methacrylate, phenyl methacrylate, the decyl methacrylates and the like; vinyl esters such as vinyl acetate, vinyl propionate, the vinyl butyrates, vinyl benzoate, isopropenyl acetate, and the like; the vinyl aromatics such as styrene, alpha-methyl styrene, vinyl toluene, the vinyl xylenes, the vinyl naphthalenes, isopropenyl benzene and the like; vinyl amides such as acrylamide, methacrylamide, N-methyl acrylamide, vinyl benzamide, N-vinyl pyrrolidone and the like; the vinyl halides, such as vinyl chloride, vinyl bromide, vinyl fluoride, vinylidene chloride, vinylidene fluoride, dichloro difluoro ethylene, tetrafluoroethylene and the like; olefins such as ethylene, propylene, isobutylene, butene-1 and the like.

Useful polyalkenyl monomers include those having at least two vinyl groups per molecule such as allyl acrylate, allyl methacrylate, diallyl maleate, diallyl fumarate, ethyene glycol dimaleate, diallyl itaconate, methallyl acrylate, divinyl ether, diallyl ether, dimethallyl ether, ethylene glycol dimethacrylate, 1,1,1 - trimethoxypropanedimethacrylate, glyceryl triacrylate, sucrose hexaacrylate, diallyl phthalate, triallyl cyanurate, 2,2,5,5-tetramethyl-1,5-hexadiene, 1,5-hexadiene, 1,6-heptadiene, 1,7-octadiene, 1,8-nonadiene, divinyl biphenyl, divinyl naphthalene, divinyl benzene, trivinyl benzene, diallyl benzene, diisopropenyl benzene, allyl allyloxyacetate, ethylidene dimethacrylate, methylene dimethacrylate, diallyl melamine, diallyl isomelamine, triallyl melamine, triallyl aconitate, triallyl phosphate, tetraallyl silane, tetravinyl silane, diallyl divinyl silane, tetraallyl germane, tetravinyl tin, tetravinyl germane, triacryloyl perhydrotriazine, trimethacryloyl perhydrotriazine, divinyl spirobi, methylene-bis-acrylamide, ethylene diacrylamide, N-allyl acrylamide, N,N-diallyl acrylamide, N,N-dimethallyl methacrylamide, polyallyl ethers of polyhydric alcohols such as tetraallyl pentaerythritol, hexaallyl sucrose, hexaallyl inositol, hexaallyl sorbitol, hexavinyl sucrose, and the like and others.

The acrylonitrile polymers useful in this invention may be prepared in any convenient manner such as by batch, bulk, solution, emulsion or suspension polymerization techniques, all of which are well known to those skilled in the art. For best results, however, it is preferred that the acrylonitrile polymers be prepared in an aqueous medium in the presence of an emulsifier and a redox catalyst usually comprised of a water-soluble peroxygen compound and an oxidizable sulfur compound as promoter.

The polymerization reaction may be carried out by adding all of the monomer to the reaction mixture at once or in increments or in a continuous manner during the course of the reaction. A suitable emulsifier, surface active agent, or dispersing agent is preferably used during the polymerization procedure in the preparation of the acrylonitrile polymers of this invention.

In a representative polymerization procedure, which is not meant to limit the scope of this invention, an aqueous medium containing about 0.1 to 2% of a perdisulfate salt, about 0.05 to 0.5% of a polymerization adjuvant, such as sodium bisulfite, and about 0.15 to 5% of a suitable emulsifier and the monomer is placed in an appropriate vessel which is provided with a means of agitation, such as stirring or shaking. The air in the free space of the vessel is usually displaced by an inert gas such as nitrogen. The mixture is, thereafter, brought to a temperature in the range of about 0° to about 100° C. or higher with continuous or intermittent agitation until polymerization has proceeded to the desired extent (usually 70–100% conversion).

At the conclusion of the polymerization, the polymers useful in this invention may be isolated as finely divided powders by a variety of methods. For example, the dispersion may be sprayed into a heated and/or evacuated chamber whereby the water is removed as vapor and the polymer falls to the bottom of the chamber. When the polymer is prepared in sufficiently high solids, i.e., 15% or higher, it can often be isolated as a fine, granular powder simply by filtration or centrifugation. The polymer may also be isolated by cooling the dispersion below the freezing point of the aqueous medium or by the addition of a large volume of a lower aliphatic alcohol such as methanol or ethanol. A satisfactory procedure consists in adding an appropriate amount of an electrolyte solution to the diluted aqueous dispersion with rapid agitation at a temperature just below the point at which the precipitated particles tend to adhere. This procedure yields a polymer in the form of granular particles which are readily filtered and washed. Suitable electrolytes include sodium chloride, sodium sulfate, hydrochloric acid, phosphoric acid, calcium chloride, magnesium sulfate, lead nitrate, lead acetate, stannous chloride and aluminum sulfate. After precipitation of the polymer, it is filtered and washed repeatedly with water to remove traces of electrolyte and dispersing agent which may adhere to the particles. Washing with dilute solutions of caustic soda or ammonium hydroxide assists in removing the last traces of dispersing agent and at the same time yields polymers of improved heat stability. In order to facilitate low temperature drying of the polymers, it is beneficial to employ a final wash with a lower aliphatic alcohol such as methanol or ethanol. The acrylonitrile polymers embodied herein are resinous polymers usually having molecular weights of from about 20,000 to 1,000,000 or more and preferably of from about 80,000 to about 500,000.

The solvent component useful in the present invention can be one or more volatile polar solvents including dimethyl formamide, dimethyl thioformamide, N-methyl-beta-cyano-ethyl formamide, alpha-cyano acetamide, N-methyl pyrrolidone, gamma-butyrolactone, ethylene carbonate, tetramethyl oxamide, epsilon-cyanolactone, 1,3,3,5 - tetracyanopentane, dimethyl cyanamide, dimethyl methoxy acetamide, N-formyl morpholine, N-formyl hexamethylene imine, dimethyl sulfoxide, propiolactone, N,N-dimethyl acetamide, dimethyl sulfone, tetramethylene-cyclic sulfone, ethylene cyanhydrin, nitromethane, acetonitrile, malonitrile, tris-dimethylaminophosphinic oxide, N,N'-tetramethylmethane phosphoramide and the like.

The acrylonitrile polymer-solvent dry blends embodied herein are those having at least 45% by weight of acrylonitrile polymer and no more than about 55% by weight of solvent. Dry blends, according to this invention, having more than about 80% by weight of the acrylonitrile polymer are not easily extruded or otherwise formed into shaped articles. The preferred dry blends according to this invention are those containing from about 50% to 75% by weight of the acrylonitrile polymer and from 25% to 50% by weight of the solvent component.

If desirable, minor amounts of lubricants, dyes, bleaching agents, pigments, antistatic agents, reinforcing agents and the like may be incorporated into the dry blends of this invention or the final shaped articles prepared therefrom may be after-treated with agents of these types.

Stabilizers of various types may also be included in the dry blends or the final shaped articles prepared by the process of this invention. Useful stabilizers include the phosphorous-containing polyphenolic compounds more fully disclosed in U.S. Patent No. 2,931,696; the polyphenolic alkane compounds more fully disclosed in U.S. Patent No. 2,931,697; hydrofluoboric acid and water-soluble salts thereof as more fully disclosed in U.S. Patent No. 2,846,423; ethylene diamine tetraacetic acid and similar compounds as more fully disclosed in U.S. Patent No. 3,003,993; manganese salts as more fully disclosed in U.S. Patent No. 2,661,346; certain amine salts as more fully disclosed in U.S. Patent No. 2,835,647; and the adjuvants more fully disclosed in U.S. Patent No. 2,748,097.

The particulate acrylonitrile polymers useful herein must have a surface area of at least about 10 square meters per gram. Although there is really no upper limit in the surface area of useful acrylonitrile polymers in the present invention, the present practical upper limit appears to be about 40 to 50 square meters per gram. We have found that particulate, resinous acrylonitrile polymers having a surface area below 10 square meters per gram will not form dry blends with a solvent component within the ranges of usefulness of this invention. Blends of polymer having a surface area below 10 square meters per gram, form sticky, lumpy blends with the solvent component which are not useful for further forming use such as extrusion. The particulate acrylonitrile polymer and the solvent component can be dry blended to give a dry particulate blend conveniently in a high speed mixer, such as a Waring Blendor, a Henschel mixer or other similar device.

The dry blends of acrylonitrile polymer and solvent component are prepared by blending the acrylonitrile polymer of proper surface area with the solvent component in a suitably efficient high speed mixer at a relatively low temperature.

The dry blends of the particulate acrylonitrile polymer and solvent component can be handled at elevated temperatures of from about 150° F. to about 450° F. as thermoplastic resins are conventionally handled. For instance, the dry blend can be added to an extruder and at an elevated temperature it is plastified and a web or other form can be extracted therefrom in a conventional manner. The web thus prepared can then be oriented in one or two directions and the oriented film can then be dried or heat set and dried to produce an oriented film having excellent physical and chemical properties.

In similar fashion, tubes, rods and other shapes may be formed from the dry blend. The dry blend may also be used at elevated temperatures in other thermoforming operations such as injection molding, compression molding, calendering, milling, internal mixing, vacuum forming, pressure forming, shrink forming and the like to form useful shaped articles.

The solvent-containing shaped articles prepared according to the process of the present invention can be used per se, the solvent can be removed by evaporation, extraction or other means or the solvent-containing shaped articles can be further shaped, expanded, contracted, oriented, etc., prior to removal of the solvent.

Solvent-containing films or webs prepared by the process of this invention, for instance, can be stretched in one or more directions prior to removal of the solvent to produce final oriented films having excellent physical properties. The orientation of solvent-containing acrylonitrile polymer films is more fully described in the copending U.S. patent application of R. E. Isley, R. C. Adams and L. E. Ball, Ser. No. 397,041, filed June 22, 1964, and the copending U.S. patent application of L. E. Ball, Ser. No. 421,612, filed Dec. 28, 1964.

The solvent-containing film can be stretched at a selected temperature, usually in a gaseous atmosphere such as air or nitrogen, in two mutually perpendicular directions simultaneously or sequentially to form an oriented film still containing solvent. It is preferred to heat set the oriented film for the final drying. Removal of all or most of the solvent remaining in the film is carried out while the oriented film is maintained in a dimensionally fixed condition so that little or no dimensional change in the plane of the film occurs during this heat setting or drying step. The dried film is then usually cooled, preferably before releasing it from its dimensionally fixed condition so as to avoid usually undesirable dimensional change.

The orientation of a film prepared according to the present process is conveniently carried out by passing the solvent-containing film continuously through a drafter or similar device for accomplishing a longitudinal stretching. The drafter may be a conventional four-roll device having two hot rolls and two cold rolls. For instance, the film may be drawn in the machine direction by passing it between or around a pair or series of slow rolls, which may be heated to the desired drawing temperature and then between or around a pair or series of fast rolls, the two pairs or series of rolls being closely spaced so that the film is supported on the rolls over most of the region in which it is subjected to tension, and transverse shrinking is reduced to a minimum. A useful alternative method of heating the film is by means of radiant heat applied to a small length of film, in the desired drawing region, as is consistent with the need to heat the film to the desired drawing temperature. In the drafting operation it is desirable to employ temperatures of from about 100 to 260° F. and preferably from about 135 to 220° F. on the hot rolls and the cold rolls preferably are maintained at or near room temperature. The stretch ratio of the film employed in the drafting operation should be from 1.2:1 to 10:1 stretched length-to-original length and preferably from about 2:1 to 4:1. The film, still containing solvent, next is fed continuously into a tenter or similar apparatus where transverse stretching is carried out. One type of apparatus for drawing the film in a transverse direction comprises a tenter frame on a pair of revolving, angularly designed ground discs that are adapted to coact with opposite margins of the film, each margin being held in the groove of the disc by means of an endless belt. Another tenter is made up of two parallel chains which run in adjustable tracks and run in a horizontal plane. The width of the chains is governed by the distance betwen the adjustable tracks. The film is gripped by the chains and stretched in substantially right angles to the length or the direction of travel of the film. The tenter is contained in an enclosure which can be heated to any desired temperature. It is also often desirable to have a preheat zone in which the film is brought up to tentering temperature before the actual transverse stretching of the film begins. The tentering operation is usually carried out at a temperature in the range of from about 100 to about 260° F. and preferably from about 160 to 210° F. The ratio of stretching in the tentering operation is about the same as that described for the drafting operation. The drafting and tentering operations can be carried out simultaneously in suitable apparatus at a temperature of from about 100 to 260° F. and at the end of the operation the film still retains some of the solvent originally present before this operation started. The film is next heat set or finally dried which usually comprises maintaining it in a fixed position relative to the plane of the film so that it cannot contract either laterally or longitudinally and heating it at from about 125 to 250° C. for from a fraction of a second up to about 5 minutes. The length of time of this operation will depend to a large degree upon the particular temperature employed. For the higher heat setting temperatures, shorter periods of time are required. It is to be understood that the film after tentering can be relaxed somewhat before heat setting if it be so desired. Finally, the film is cooled to about room temperature and rolled up or cut up in various lengths and shapes, depending upon the particular end use requirement.

Oriented films prepared by the foregoing process are outstanding barriers for gases, vapors and the like. They also have excellent chemical resistance, dimensional stability, resistance to degradation by atmospheric influences and mechanical strength. These oriented films are useful in a wide variety of applications such as magnetic tape, surfacing and laminating, packaging, electrical insulation, pressure sensitive tape, glazing and the like.

The surface area of the acrylonitrile polymers embodied herein was determined by nitrogen adsorption using a modified BET method. A correlation between surface area and bulk density of the acrylonitrile polymers was found and the bulk density measurements were determined by the procedure of ASTM D–954–50.

The process of this invention is further illustrated in the examples wherein the amounts of ingredients are expressed in parts by weight unless otherwise indicated.

Example I

An acrylonitrile copolymer was prepared from the following recipe:

| | Parts |
|---|---|
| (a) Water | 400 |
| (b) Emulsifier [1] | 3.5 |
| (c) Ammonium persulfate | 0.5 |
| (d) Potassium metabisulfite | 0.23 |
| (e) t-Dodecyl mercaptan | 0.7 |
| (f) Acrylonitrile | 1.76 |
| (g) Butanediol-1,4-divinylether | 0.34 |
| (h) Acrylonitrile | 97.9 |

[1] A mixture of 
$$R-O-(CH_2CH_2O)_n-P\begin{matrix}\diagup O \\ \diagdown (OM)_2\end{matrix}$$ 
and 
$$\begin{matrix}R-O-(CH_2CH_2O)_n \diagdown \\ \phantom{R-O-(CH_2CH_2O)_n}P\begin{matrix}\diagup O \\ \diagdown OM\end{matrix} \\ R-O-(CH_2CH_2O)_n \diagup\end{matrix}$$
wherein $n$ is a number of from 1 to 40, R is an alkyl or alkaryl group and preferably a nonyl phenyl group and M is hydrogen, ammonia or an alkali metal which is an emulsifier marketed by the General Aniline and Film Company as GAFAC RE-610.

Ingredients (a) through (e) were charged into a reactor and the temperature of the mixture was brought to 50° C. with stirring. A nitrogen atmosphere was maintained in the reaction vessel. Ingredients (f) and (g) were added and polymerization of these two monomers was substantially completed in about a 90 minute period. Then the ingredient (h) was added continuously over a 195 minute period while the reaction mixture was maintained at 50° C. and the resulting polymer dispersion was stirred and heated at 50° C. for an additional three hours. The final product was a suspension of polymer in water from which the polymer was readily isolated by filtration. The isolated polymer was washed on the filter and dried in a tray type oven at a temperature of from about 60–70° C. to produce a product having a surface area of 30 square meters per gram and a bulk density of about 0.3 gram per cubic centimeter. The type of drying has a marked effect on the surface area of the polymer particles. For instance, when the foregoing polymer was dried in a rotating vacuum drier under the same conditions, a dried product having a surface area of only about 20 square meters per gram or bulk density of about .45 gram per cubic centimeter was obtained.

The dry blends were prepared by mixing the foregoing acrylonitrile polymer particles having a surface area of 30 square meters per gram with various solvents in various proportions as shown in Table I. The dry blends were prepared in a high speed, powder mixer at a maximum temperature of about 300° F. The acrylonitrile polymer was all added to a Prodex Henschel mixer (2JSS, useful capacity ¼ cu. foot), and with the mixer running, the solvent was slowly added and a dry mix of the desired consistency was produced (about five minutes mixing after the completion of the addition of the solvent). The mixer was then opened and the product was dumped out and was ready for use in further thermoforming operations.

The various dry blends prepared as above and described in Table I were extruded from a Brabender extruder equipped with a ¼ inch rod die. In each case a clear, colorless rod was produced. "DMF" means dimethyl formamide, "EtCO₃" means ethylene carbonate, and "DMSO" means dimethyl sulfoxide.

TABLE I

| Parts Polymer | Parts, Solvent |
|---|---|
| 52 | 48 DMF |
| 50 | 50 {80 DMF / 20 EtCO₃} |
| 45 | 55 {70 DMF / 30 EtCO₃} |
| 50 | 50 {60 DMF / 40 EtCO₃} |
| 60 | 40 {60 DMF / 40 EtCO₃} |
| 55 | 45 {60 DMF / 40 EtCO₃} |
| 48 | 52 {60 DMF / 40 EtCO₃} |
| 60 | 40 {40 DMF / 60 EtCO₃} |
| 54 | 46 {60 DMF / 40 DMSO} |
| 60 | 40 {50 DMF / 50 N-methyl-pyrrolidone} |
| 53 | 47 N-methyl-pyrrolidone |
| 60 | 40 N-methyl-pyrrolidone |
| 60 | 40 {50 N-methyl-pyrrolidone / 50 EtCO₃} |
| 70 | 30 EtCO₃ |
| 75 | 25 EtCO₃ |

Similarly, the foregoing dry blends were extruded through a rod die having a ⅛″ diameter opening and the extrudate was pulled to a diameter of 0.04 inch and finally stretched 5:1 and dried. The final monofilament had a diameter of about 0.015 inch and was found to have a tensile strength of $20.8 \times 10^3$ p.s.i. and an elongation of 62.9%.

EXAMPLE II

Polymer samples described in Example I were dry blended with various amounts of solvents as shown in Table II and the dry blend was extruded in the form of a film, sheet or web. The film extrusion line was made up of the standard extruder screw, barrel, die, take-off equipment and wind-up equipment. The size of the extruder is distinguished by the diameter of the screw and also by the ratio of length to diameter of screw ($L/D$). Popular pilot plant extruders have a 2½″ screw and an $L/D$ of 20:1 to 24:1. Screws are generally cut with square pitch; that is, the distance between flights is equal to the diameter of the screw. Screw design is perhaps the most important single component of an extrusion line. A standard screw design has a feed section, a transition or compression section and a metering section. The material enters the feed section, is compressed in the transition section and enters the high shear metering section. On a 2½″ extruder the barrel is usually divided into four heat zones which are individually instrumented for precise temperature control. The general types of dies are available, a center-fed or coat hanger die and an end fed die. Take-up equipment consists of various size, chrome plated rolls that can be heated or cooled as required. To complete the line there is a film trimming and wind-up unit.

Several extruders with several different temperature profiles were used to extrude an 8 mil. film and the details are given in Table II. All of these films were of excellent quality.

Example III

The procedure of Example II was repeated and the amount of solvent lost during the extrusion operation was determined for each film. The results of these experiments are given in Table III. In this and the other examples herein the amount of solvent in the polymer was determined by vapor phase chromatography.

TABLE III

| Extruder Size (in.) | Solvent Content, parts by weight per hundred of dry blend before extrusion | | Solvent Content of Mixture After Extrusion | | Loss, parts per hundred | |
|---|---|---|---|---|---|---|
| | DMF | EtCO₃ | DMF | EtCO₃ | DMF | EtCO₃ |
| 1¾ | 31.2 | 20.8 | 25.0 | 18.8 | 6.2 | 2.0 |
| 2½ | 27.0 | 18.0 | 23.2 | 20.5 | 3.8 | (¹) |
| 2½ | 31.2 | 20.8 | 20.4 | 19.0 | 10.8 | 1.8 |
| 2½ | 27.0 | 18.0 | 19.7 | 18.1 | 7.3 | (¹) |
| 2½ | 31.2 | 20.8 | 13.9 | 19.1 | 17.3 | 1.7 |
| 3½ | 30.0 | 20.0 | 14.8 | 18.3 | 15.2 | 1.7 |
| 3½ | 30.0 | 20.0 | 24.1 | 17.2 | 5.9 | 2.8 |

¹ Approx. 0.

Example IV

A dry blend of the acrylonitrile polymer of Example I and a solvent mixture of 60 DMF–40 EtCO₃ was prepared and extruded in the form of a film as described in Example II. The resulting film was stretched in a drafter at a stretch ratio of 2.3:1 at a temperature of 170° F. at an input speed of 100 feet per minute and an output speed of 230 feet per minute. This product was then subjected to tentering at a stretch ratio of 2.6:1 at a temperature of about 180° F. and finally was heat set at a temperature of 450° F. for a time of 20 seconds.

The biaxially oriented film prepared in the foregoing manner was found to have the following physical properties. "M.D." means machine direction and "T.D." means transverse direction.

Tensile strength, p.s.i., M.D. $17.3 \times 10^3$, T.D. $22.9 \times 10^3$.
Ultimate elongation, percent, MD 60.5, TD 47.7.
Yield strength, p.s.i., M.D. $12.5 \times 10^3$, T.D. $13.4 \times 10^3$.
Elongation at yield, percent, M.D. 4, T.D. 4.5.
Elastic modulus, p.s.i., M.D. 417,000, T.D. 495,000.
Tensile impact, ft. lb./in.², M.D. 427, T.D. 560.
Mullen burst, 52.
Water vapor transmission rate, grams/mil/100 in.²/24 hours:
    50% Rel. humidity _____ 0.093
    90% Rel. humidity _____ 0.234
Oxygen transmission, cc./mil/100 in.²/24 hours/ atmosphere _____ 0.040

Example V

A copolymer of acrylonitrile and divinyl benzene was prepared in a single step polymerization using the following ingredients in a single charge:

| | Parts |
|---|---|
| Distilled water | 400 |
| Acrylonitrile | 100 |
| Divinyl benzene | 0.38 |
| t-Dodecyl mercaptan | 0.6 |
| GAFAC RE 610 emulsifier | 3.5 |
| Ammonium persulfate | 0.5 |
| Sodium metabisulfite | 0.23 |

TABLE II

| Extruder Size (in.) | Stock Composition | | | Temperature, °F. | | | | | P.s.i. Pressure | Film Width (feet) |
|---|---|---|---|---|---|---|---|---|---|---|
| | Percent Polymer | Percent DMF | Percent EtCO₃ | Zone 1 | Zone 2 | Zone 3 | Zone 4 | Die | | |
| 1¾ | 48 | 31.2 | 20.8 | 325 | 328 | ---- | ---- | 300 | 450 | 1 |
| 2½ | 55 | 27 | 18 | 160 | 310 | 310 | 360 | 300 | 600 | 1¼ |
| 2½ | 48 | 31.2 | 20.8 | 290 | 350 | 370 | 380 | 325 | 1,000 | 1½ |
| 2½ | 55 | 27 | 18 | 190 | 241 | 331 | 363 | 340 | 1,250 | 2 |
| 3½ | 50 | 30 | 20 | 290 | 290 | 338 | 380 | 300 | 500 | 5 |

The first five ingredients were charged to the reactor which was then purged with nitrogen and brought to 50° C. under agitation. The polymerization was accomplished by the addition of the last two ingredients (initiator—ammonium persulfate and sodium metabisulfite). The polymerization reaction was carried out for about six hours. The resulting polymer was isolated by filtration and was washed thoroughly to remove emulsifier and initiator and was then air dried at 70° C. for 36 hours. The yield of polymer was 96% of theory and it had a surface area of 29 square meters per gram.

The foregoing polymer gave similar results when it was substituted in the procedures of Examples I-IV.

Example VI

Acrylonitrile was homopolymerized in aqueous emulsion with a redox initiator and a mercaptan modifier for molecular weight control. The following ingredients were placed in a three liter, three neck, round bottom flask equipped with stirrer, thermometer, nitrogen inlet and reflux condenser:

| | Parts |
|---|---|
| Water (deoxygenated and nitrogen purged) | 400 |
| Acrylonitrile (free of inhibitor) | 100 |
| Emulsifier (GAFAC RE 610) | 3.5 |
| Modifier (t-dodecyl mercaptan) | 0.35 |
| $(NH_4)_2S_2O_8$ | 0.50 |
| $Na_2S_3O_5$ | 0.23 |

The polymerization reaction was carried out at 50° C. for a period of 5½ hours with continuous stirring in a nitrogen atmosphere. Polyacrylonitrile was recovered by coagulation with aqueous aluminum sulfate solution and washing by water to remove residual emulsifier. The polymer was dried by the procedure given in Example II. The dried polymer was found to have a surface area of 31 square meters per gram.

This polymer gave similar results when it was substituted in the procedures of Examples I-IV.

Example VII

This example demonstrates an acrylonitrile polymer which is outside the scope of the present invention because of its low surface area.

Polyacrylonitrile was prepared at 140° F. without an emulsifier using the following ingredients and the procedure given in Example V:

| | Parts |
|---|---|
| Acrylonitrile | 100 |
| Water | 200 |
| t-Dodecyl mercaptan | 1.2 |
| Polyvinyl pyrrolidone | 0.25 |
| Azobisisobutyronitrile | 0.5 |

The polymerization time was six hours. The resulting slurry was separated by centrifugation, the solid was washed thoroughly with water and dried at 70° C. at reduced pressure. This polymer was found to have a surface area of 5 square meters per gram. An attempt was made to prepare dry blends of this polymer and the various solvents and solvent mixtures by the procedure described in Example I, but in every instance the blend was lumpy, sticky and not a dry powder. In one attempt, 75 parts by weight of the foregoing polymer and 25 parts by weight of ethylene carbonate were blended in a Prodex Henschel mixer by the procedure of Example V and when the mixer was opened, the blend could not be dumped out. It was necessary to scrape the lumpy, sticky mass which resulted from the mixer and this blend could not be fed to the extruder because it was held up in the hopper.

We claim:

1. The process for preparing a thermoformable polymer/solvent dry particulate blend comprising intimately mixing from 45 to 80% by weight of a particulate, resinous acrylonitrile polymer composed of 90% by weight or more of polymerized acrylonitrile and from 55 to 20% by weight of a solvent for said acrylonitrile polymer, said acrylonitrile polymer having a surface area of at least about 10 square meters per gram.

2. The process of claim 1 wherein the acrylonitrile polymer is polyacrylonitrile.

3. The process of claim 2 wherein the polyacrylonitrile is present in from about 50 to 75% by weight.

4. The process of claim 3 wherein the solvent is a combination of dimethyl formamide and ethylene carbonate.

5. The process of claim 3 wherein the solvent is ethylene carbonate.

6. The process for preparing a shaped acrylonitrile polymer article comprising thermoforming the polymer-solvent dry particulate blend of claim 1 at an elevated temperature and removing the solvent from the shaped article.

7. The process of claim 6 wherein the acrylonitrile polymer is polyacrylonitrile.

8. The process of claim 7 wherein the thermoforming process is extrusion.

9. The process of claim 8 wherein the shaped article is a film.

10. The process of claim 8 wherein the shaped article is a rod.

11. A thermoformable dry particulate blend composition comprising an intimate mixture of from 45 to 80% by weight of a particulate, resinous acrylonitrile polymer composed of 90% by weight or more of polymerized acrylonitrile and from 55 to 20% by weight of a solvent for said acrylonitrile polymer, said acrylonitrile polymer having a surface area of at least about 10 square meters per gram.

12. The composition of claim 1 wherein the acrylonitrile polymer is polyacrylonitrile.

References Cited

UNITED STATES PATENTS

| 2,706,674 | 4/1955 | Rothrock | 264—211 |
|---|---|---|---|
| 2,540,475 | 2/1951 | Dalton | 260—34.2 |
| 2,559,172 | 7/1951 | Schneider et al. | 260—32.6 |
| 2,878,228 | 3/1959 | Campbell et al. | 260—32.6 |
| 2,971,937 | 2/1961 | Ham et al. | 260—32.6 |
| 3,202,641 | 8/1965 | Nakajima et al. | 260—32.6 |

MORRIS LIEBMAN, *Primary Examiner.*

JULIUS FROME, *Examiner.*

L. T. JACOBS, *Assistant Examiner.*